United States Patent [19]

Mohs

[11] Patent Number: 4,905,742

[45] Date of Patent: Mar. 6, 1990

[54] PNEUMATIC SAFETY CIRCUIT FOR AIR INFLATION DEVICES

[75] Inventor: Michael C. Mohs, Scarborough, Canada

[73] Assignee: Bruno Wessel Limited, Scarborough, Canada

[21] Appl. No.: 316,283

[22] Filed: Feb. 27, 1989

[51] Int. Cl.⁴ .............................................. B60C 23/00
[52] U.S. Cl. ...................................... 141/38; 141/83;
    141/98; 141/95; 141/197; 152/416; 137/224.5;
    73/146.2
[58] Field of Search ...................... 141/38, 83, 84, 197,
    141/95, 98; 152/415–417; 73/146.2, 146.3;
    137/224, 224.5

[56] References Cited

U.S. PATENT DOCUMENTS

| | | | |
|---|---|---|---|
| 4,421,151 | 12/1983 | Stumpe | 152/417 |
| 4,456,038 | 6/1984 | Gwaltney et al. | 141/95 |
| 4,619,303 | 10/1986 | Bryan et al. | 152/416 |
| 4,641,698 | 2/1987 | Bitonti | 152/416 |
| 4,702,287 | 10/1987 | Higbie et al. | 141/83 X |
| 4,744,399 | 5/1988 | Magnuson et al. | 152/417 |
| 4,763,709 | 8/1988 | Scholer | 141/38 X |
| 4,800,892 | 1/1989 | Perry et al. | 137/224 X |

FOREIGN PATENT DOCUMENTS 0221424  4/1985  German Democratic Rep. ... 141/38

*Primary Examiner*—Ernest G. Cusick
*Attorney, Agent, or Firm*—Anthony J. Casella; Gerald E. Hespos

[57] ABSTRACT

The invention provides a pneumatically operated circuit for automatically shutting off the flow of high pressure air being introduced into an object such as a tire, when the pressure in the object reaches a preselected maximum pressure significantly below the high pressure supply. The air is introduced automatically in timed, high pressure bursts and between the time bursts a safety mechanism gauges the pressure that has built up in the object and interrupts further timed bursts when the latter pressure exceeds the preselected maximum.

13 Claims, 2 Drawing Sheets

PNEUMATIC SAFETY CIRCUIT FOR AIR INFLATION DEVICES

BACKGROUND OF THE INVENTION

This invention relates to pneumatic safety circuits for air inflation devices. More particularly it relates to pneumatic safety circuits that can be installed in the pneumatic circuits of tire inflating machines or tire mounting machines being built by a machine manufacturer and also can be installed on existing tire inflating machines or tire mounting machines, which are generally devoid of pneumatically operated safety circuits, to retrofit them and upgrade their safety standards.

In garages and tire installation and repair shops, a supply of high pressure, "shop" air is available to operate pneumatic tire mounting machines that are used to press, lever, and wedge tires off or onto tire rims or automobile wheels. The same air supply, at the shop pressure usually in the range of 125 to 175 psi, (862 to 1207 KPa), is used to inflate the tires to the appropriate tire pressure usually in the range of 30–50 psi, (207 to 345 KPa), to insure they are in place on the wheels. In order to seat the beads of a modern tire to the rim, it is sometimes necessary to overinflate the tire temporarily, after which the tire pressure is reduced to the desired running pressure. Also, the tires often are inflated before a valve core is installed in the valve stem, to expedite build up of pressure in the tire. With no valve core in the valve stem, tire pressure can build up extremely rapidly with shop air.

Control of pressure build-up in the tire generally is achieved by operation of a pneumatic supply valve, either manual or pedal operated, which opens and closes in the line from the shop air supply to the tire being inflated. A pressure gauge in this line indicates, when the supply valve is closed and the line connected to the tire, what the pressure in the tire is. By intermittently operating the supply valve, the build-up of pressure in the tire can be monitored, but careless or inattentive operation of the supply valve has been known to overinflate and burst tires, causing serious damage to personnel and property.

To preclude such accidents, it has been suggested to have additional switching facilities to control the shop air supply, but these facilities appear invariably to involve electrical circuitry, making them inappropriate or useless for retrofitting existing tire mounting machines which are entirely pneumatic in operation. Furthermore, the additional switching facilities generally operated by merely reducing the pressure being applied to inflate a tire, thus greatly retarding the rate of inflation and inducing operators to bypass them to expedite their work.

SUMMARY OF THE INVENTION

The present invention has been developed, using existing commercially available parts for all essential equipment and using only pneumatics, for automatically admitting a shop air supply to a tire in timed bursts, optionally until the pressure therein achieves a predetermined minimum pressure at which point a warning signal is given and, in any event, eventually automatically cutting off the shop supply to the tire after air from the shop supply has further built up the tire pressure to a predetermined desired pressure.

The invention thus consists in a safety circuit for air inflation devices having a high pressure pneumatic supply line connected to an object to be inflated to a pressure significantly lower than the supply line pressure, through an operator controlled valve in said high pressure pneumatic supply line, said safety circuit comprising:

(1) a first pneumatic duct connecting high pressure air from the outlet of said operator controlled valve to the inlet of a spring biased, normally closed, pilot operate, 3-way valve, (2) a second pneumatic duct connecting high pressure air from an outlet of said pilot operated 3-way valve to an object to be inflated when said pilot operated 3-way valve is in opened position, a second outlet of said pilot operated 3-way valve also connecting said object to be inflated to a pneumatic safety line, hereinafter defined, when said pilot operated 3-way valve is in closed position, (3) a third pneumatic duct connecting the outlet of said operator controlled valve to the inlets of each of a pair of 3-way pilot operated delay valves, the first said 3-way delay valve being a spring biased, normally open valve, the second said 3-way delay valve being a spring biased normally closed valve, the delay time of the first said 3-way delay valve being significantly different from the delay time of the second said 3-way delay valve, (4) a fourth pneumatic duct connecting an outlet of the first said 3-way delay valve to the pilot side of said second 3-way delay valve when the first said 3-way delay valve is in opened position, the first said 3-way delay valve connecting said fourth pneumatic duct to an atmospheric discharge when in closed position, (5) a fifth pneumatic duct connecting an outlet of the second said 3-way delay valve to the pilot side of said pilot operated 3-way valve when the second said 3-way delay valve is in opened position, the second said 3-way delay valve connecting said fifth pneumatic duct to an atmospheric discharge when in closed position, (6) a sixth pneumatic duct connecting the said outlet of the said second 3-way delay valve to the pilot side of said first 3-way delay valve when the second said 3-way delay valve is in opened position, (7) a pneumatic safety line connecting said second outlet of said pilot operated 3-way valve to the inlet of a relief valve means adapted to discharge the pressure in said safety line at a preselected pressure.

(8) a seventh pneumatic duct connecting the discharge of said relief valve means to valve means which prevents further flow of high pressure air from the operator controlled valve to the object to be inflated.

BRIEF DESCRIPTION OF THE DRAWINGS

The invention may be more readily understood from the following specification by reference to the accompanying drawings in which.

DETAILED DESCRIPTION OF THE PREFERRED EMBODIMENTS

As used herein the term duct is intended to include any tube, pipe, enclosed channel, enclosed canal, or open-ended line capable of maintaining or conducting air under pressure, without loss, between its open ends.

In the accompanying schematic drawings of the pneumatic circuits, the symbols used for the various pneumatic components are those adopted by the American National Standards Association (ANSI) for such components.

Figure 1:
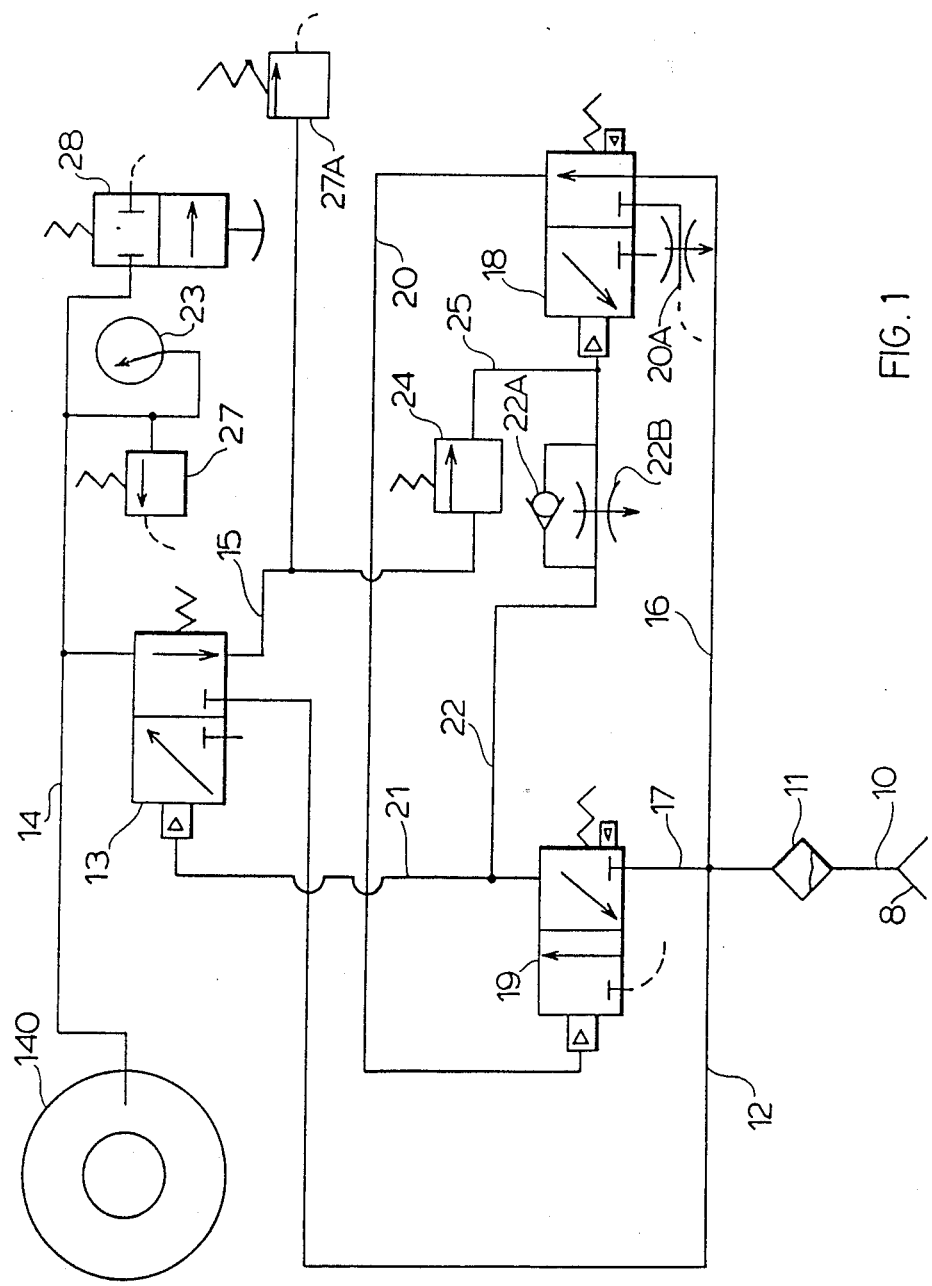
FIG. 1 is a schematic drawing, using available ANSI symbols, of a pneumatic safety circuit of the invention incorporated in a simple pneumatic tire inflating device, with some optional features included in the safety circuit.

In FIG. 1, legend 10 indicates a high pressure air supply line leading from a pneumatic supply 8 having an operator's pedal controlled or manually controlled valve.

The supply conveniently comes from a commercial air compressor at pressures in the range from 125 psi to 175 psi (862 KPa to 1207 KPa), and most conveniently is in the range of 140 psi to 150 psi (955 KPa to 1034 KPa). The operator's control valve conveniently is spring biased in the closed position, and is maintained open only by sustained action of an operator, although with the pneumatic safety circuit of the present invention it need not be spring biased. However it is preferred that it be so biased, as an extra safety feature against operator inattention.

A pneumatic duct or line 12 connects the outlet of the operator's valve through an optional filter, 11, to remove entrained solids and liquids that could interfere with operation of pneumatic valves, to the inlet of a spring biased, normally closed, pilot operated, 3-way valve, 13, the outlet of which is connected by a pneumatic line 14 to a pneumatic tire 140 or other object to be inflated when the pilot operated valve is in the opened position; when the pilot operated valve is in the closed position, line 14 is connected by the valve 13 to a pneumatic safety line, 15. Further details about the safety line are presented later herein.

Another pneumatic duct or line 16 connects the outlet of filter 11 to the inlet of a first 3-way delay valve 18 which is spring biased in the open position, while still another pneumatic duct or line 17 connects the outlet of filter 11 to the inlet of a second 3-way delay valve 19 which is spring biased in the closed position. The delay times of these two delay valves are set so that the delay time of the first is shorter than that of the second, as will be more fully explained later.

The outlet of the first 3-way delay valve 18 in the open position is connected by a pneumatic duct or line 20 to the pilot side of the second 3-way delay valve 19. When valve 18 is moved to the closed position, the outlet of valve 18 bleeds or discharges line 20 to atmosphere through needle valve 20A or equivalent constriction, for example a fixed orifice choke, thus delaying the closing of valve 19 by its bias spring. The outlet of the second 3-way delay valve 19 in the open position is connected to two pneumatic ducts or lines 21 and 22; line 21 is connected at its distal end to the pilot side of pilot operated 3-way valve 13, and line 22 at its distal end is connected through check valve 22A to the pilot side of first 3-way delay valve 18. When valve 19 is moved to the closed position, the outlet of valve 19 also bleeds or discharges lines 21 and 22 to atmosphere through valve 19, with line 21 bleeding rapidly and line 22 bleeding more slowly due to the constriction of a needle valve 22B, or equivalent fixed orifice choke, thus delaying the closing of valve 18.

The operation of the circuit described above for inflating a tire or other inflatable object, without operation of the safety circuit, will now be described.

To initiate inflation an operator must open the operator's valve to filter 11, by its pedal or manually, and hold it open to high pressure air supply line 10 if the operator's valve is spring biased to the closed position, which is the preferred, safer, operating arrangement. When the operator's valve is opened, it immediately pressurizes line 12 to valve 13 and line 16 through open valve 18 to line 20 and the pilot side of valve 19, immediately opening delay valve 19; at the same time line 10 pressurizes line 17 to valve 19 which has been simultaneously opened by pressure on the pilot side of valve 19, and pressure flows through valve 19 and line 21 to the pilot side of pilot operated 3-way valve 13, forcing valve 13 to open and admit high pressure air from line 12 to line 14 and thence to the tire or other object to be inflated. The foregoing actions all occur substantially instantaneously. Simultaneously with the opening of valve 19, pressure flows from line 17 through line 22 and check valve 22A to the pilot side of valve 18, forcing it to its closed position thus cutting off the pressure from line 16 to line 20, and permitting the pressure on the pilot side of valve 19 to bleed back through line 20 and 3-way valve 18 which has been forced to the discharge position by pressure through line 22, and thence to discharge to atmosphere through needle valve 20A or equivalent constriction. The bleeding to atmosphere requires a finite time controlled by the setting of needle valve 20A or equivalent constriction and conveniently is set for a period of a few seconds, for example between two and eight seconds, preferably substantially four to five seconds. During the time air pressure is bleeding from the pilot side of valve 19 through needle valve 20A and out to atmosphere via line 20 and 3-way valve 18 in its discharge position, 3-way valve 19 remains in its open position, pilot operated 3-way valve 13 remains in its open position, and air at full pressure of the supply line flows through lines 12 and 14 to the tire or other object being inflated. When air pressure on the pilot side of delay valve 19 has all bled back and been exhausted to atmosphere through line 20, valve 18, and needle valve 20A, valve 19 immediately moves to its closed (discharge) position under bias of its spring, and air pressure from line 17 is cut off from line 21, leading to the pilot side of valve 13, and from line 22 leading to the the pilot side of valve 18. The pressure in line 21 immediately exhausts to atmosphere through delay valve 19, and valve 13 moves to its closed position under bias of its spring, thus connecting the pressure in line 14 and the tire or other object being inflated, through valve 13, to pneumatic safety line 15. Optionally and conveniently the line 14 has an pneumatic gauge, 23, connected thereto, which registers the pressure in line 14 and the tire or other object being inflated when valve 13 is in closed position, and can be observed by an attentive operator; however, a pneumatic gauge is not essential to the operation of the pneumatic safety line and is present only for unessential periodic visual observation of the build-up of pressure in the tire or other object being inflated.

When pressure in line 21 exhausts through valve 19 to atmosphere by the closing of valve 19, pressure in line 22 from the pilot side of valve 18 also begins to exhaust to atmosphere, but this must bleed back through needle valve 22B or equivalent constriction, and requires a finite time, conveniently controlled by the setting of needle valve 22B. The time appropriate for bleeding back to atmosphere and allowing valve 18 to be opened by its spring bias is relatively short compared to the time appropriate for valve 19 to be closed by its spring bias, being generally only a fraction of a second; preferably the time is from one quarter of one second to two seconds, most preferably substantially one half second. During this relatively short time period, valve 13 is in its closed position and the pressure in line 14 is being applied through 3-way valve 13 to pneumatic safety line 15.

It has already been mentioned that line 14 may include a pressure gauge 23 as an optional feature. The essential feature of pneumatic safety line 15 is a side outlet relief valve or equivalent means 24, which (a) discharges through pneumatic line 25 to the pilot side of 3-way valve 18 and (b) is set to maintain valve 18 in the pilot actuated position only when the sum of the pressure in line 25 and the pressure of the spring bias of valve 18 reaches the pressure to which the tire, or other object to be inflated, is intended to be inflated. If that pressure sum has not been reached, any pressure in line 25 bleeds back relatively quickly, generally in a fraction of a second as previously mentioned, through needle valve 22B and exhausts through line 22 and valve 19 in its closed position, after which valve 18 opens, under its spring bias, and the cycle of (a) pressurizing line 20, (b) opening valves 19 and 13, and (c) inflating the tire or other object to be inflated for a time controlled by the setting of delay valve 19, is repeated.

The brief period of a fraction of a second during which the pneumatic safety line 15 is pressurized can conveniently be referred to as a gauging period or testing period; if there is a gauge, such as 23, connected to line 14, the gauge will register the pressure that has been built up in line 15. In any event, the pressure in line 15, following a series of bursts of pressure from the air supply 10 through pilot operated valve 13, eventually reaches, during a final gauging or test period, a pressure equal to that at which valve 24 is set to maintain valve 18 in the pilot actuated position; valve 24 thus eventually permits the pressure from line 15 to the pilot side of 3-way valve 18 to hold valve 18 in the pilot actuated position. With valve 18 maintained in the pilot actuated position, the cycle of inflating and gauging is interrupted, as line 20 cannot be pressurized, hence valves 19 and 13 cannot be opened, and air from the supply 10 cannot flow into the tire or other object to be inflated. Hence the operator's pedal or manual valve has been over-ridden, and must be returned to its closed position by the operator, and the pressure of the inflated tire or other object being inflated must be reduced in lines 14 and 15 before another cycle of inflating and gauging can be initiated.

Two additional optional features which may be attached to line 14 also are shown in FIG. 1. The first is a pressure relief means, for example a pop safety valve or a spring check valve or a second side outlet relief valve, 27, which can be attached to line 14 and set to discharge to atmosphere at a pressure in line 14 somewhat above the discharge pressure for which valve 24 is set to discharge to serve as an outlet for excess undesired pressure in line 14. Alternatively or additionally a spring check or relief valve 27A may be connected to line 15, to serve as an outlet for excess undesired pressure in line 15, with the discharge of valve 27A being set to discharge to atmosphere at a pressure somewhat below the pressure for which valve 24 is set to discharge, and being distinctly audible or arranged to go through a horn or other dinstinctly audible warning device. With this optional feature, the operator is warned audibly, as well as visually by the pressure gauge 23 if it is present, in each gauging or testing period close to the discharge pressure set for valve 24, that the tire or other object to be inflated is close to its desired inflation pressure. Valve 27A also serves as an additional safety outlet for pressure in the event of failure of valve 24 to open at its intended opening pressure. Alternatively or additionally a spring check or relief valve 27A may be connected to line 15, to serve as an outlet for excess undesired pressure in line 15.

The second additional optional feature is a manual pressure bleed valve, 28, which can be used to bleed, to atmosphere, the pressure in tire 140 and lines 14 and 15. When line 14 is eventually disconnected from tire 140, the closing of valve 24 is ensured and the re-initiation of the inflating and gauging cycle of valves 28 and 19 occurs when the operator's valve again is opened by an operator.

Valves for the safety circuit described with reference to FIG. 1 are readily available commercially. Relief valves of the pop-valve and side outlet relief valve type are well known in the art of pneumatics and readily available commercially. The pilot operated 3-way valves, 13, 18, and 19 of FIG. 1 can be for example, Model R-301 "Minimatic" (trademark) valves illustrated in the Clippard Instrument Laboratory, Inc. catalogue 484-A2, with valve 18 having a choke, illustrated as a needle valve 20A in FIG. 1, in the discharge port of valve 18. The choke need not necessarily be a needle valve however.

Figure 2:
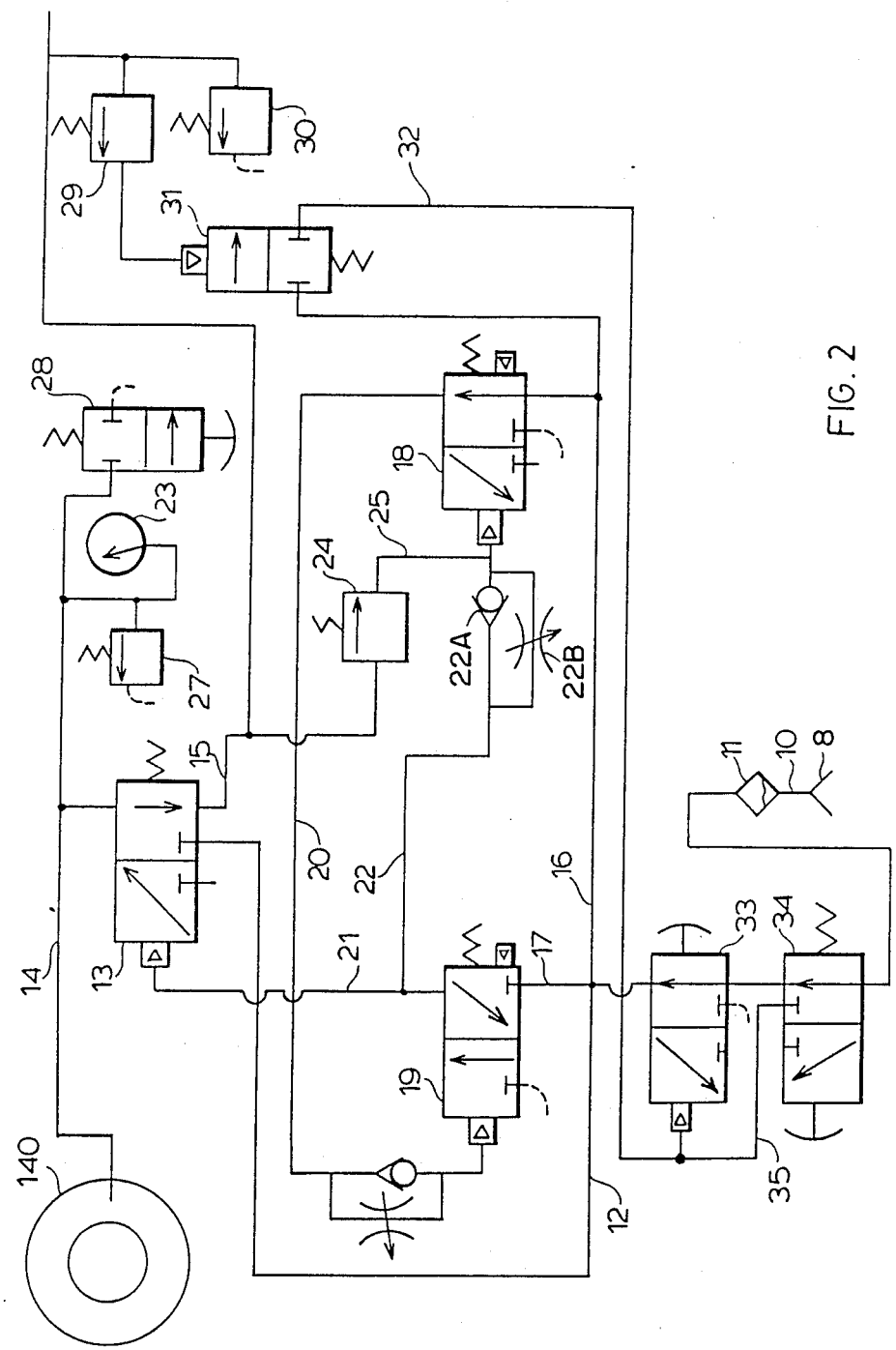
FIG. 2 is a schematic drawing of a similar pneumatic safety circuit in which the two pilot operated delay valves are dual element combinations including an adjustable flow control to provide a delay "out" function, and the circuit also includes additional or alternative optional features.

A more comprehensive safety circuit is illustrated in the embodiment of the invention shown in FIG. 2, in which functionally identical parts are indicated by the same reference characters used in FIG. 1. However, in the embodiment of FIG. 2, valves 18 and 19 can be, for example, Model 343 "Minimatic" (trademark) valves illustrated in the aforementioned Clippard Instrument catalogue; such valves have built in adjustable flow control to provide a built-in delay discharge function. This feature is illustrated in FIG. 2 by the symbols for needle valves and check valves beside each of valves 18 and 19 respectively. Additional optional features in this embodiment shown in FIG. 2 include relief valves 29 and 30, which preferably also are set to discharge pressure in line 15 when this pressure approaches or exceeds the maximum pressure to which valve 24 is intended to limit the safety circuit. Optionally, valve 30 is a pop safety valve, a spring check valve, or other pressure relief means and as a last resort discharges the safety line 15, line 14, and tire 140 to atmosphere, and side outlet relief valve 29, at a somewhat lower pressure, discharges to the pilot of a spring biased, normally closed, pilot operated two way valve 31. Pilot operation (opening) of valve 31 permits full pressure of the supply from line 16 to flow through duct or line 32, to apply to the pilot side of a manually opened, pilot closed, three-way double plunger valve, 33, thereby closing it and cutting off further air pressure to lines 12, 17, and 16 until pressure is bled from the pressurized line to atmosphere through the exhaust outlet shown for valve 33; thereafter valve 33 must be opened manually to restore supply pressure to lines 12, 17, and 16, thereby restarting an inflation sequence. Preferably, valve 29 is adapted to discharge at a pressure slightly below the pressure at which valve 24 is adapted to discharge, so that resulting operation of valve 31 and valve 33 cuts off high pressure air from the supply line before valve 24 interrupts the cycling sequence.

Valve 34 is a spring biased, normally open, manually closed, three-way valve which, in the open position, allows air supply at full supply pressure to flow through to valve 33 and lines 12, 17, and 16. On being closed manually against its spring bias, valve 34 interrupts direct flow of high pressure air through valve 33 and directs full supply pressure to the pilot side of valve 33 through line 35, thereby closing valve 33 which remains closed, cutting off further air pressure to lines 12, 17, and 16 until valve 33 is opened manually. Thus valve 33 also serves as a start button and valve 34 is a stop button for manual operations before, after, or even during an inflation sequence.

The embodiment of FIG. 2 is preferred for inflation of truck tires. Passenger car tires operate usually at pressures in the range of 25 to 35 psi (172 to 241 KPa), and are temporarily inflated only to about 40 psi (276 KPa) when the bead is being seated on the wheel; truck tires, in contrast, operate usually at pressures in the range of 75 to 125 psi (517 to 862 KPa), and are temporarily inflated to pressures of at least 90 psi (620 KPa) to ensure proper alignment of a tire and rim. Safety regulations frequently require that inflations to such pressures when mounting a tire on a rim, be conducted with the tire inside a steel safety cage. Although the safety line of the present invention does not obviate the need for a safety cage, the invention embodiment in FIG. 2 does provide a quadruple protection against over-inflation of a tire by a supply line. Thus side outlet relief valves 27 and 30 can be selected and used to relieve excess pressure in tire 140 through lines 14 and 15. Valves 24 and 29 both serve as relief valve means adapted to discharge the pressure in line 15, at a preselected pressure to which the tire is to be inflated, to valve means which prevent further flow of high pressure air through valve 13 to the tire. Valve 24 does this by allowing pressure from the tire 140, line 14, and line 15 to hold valve 18 in the closed position, hence bleeding line 20 to atmosphere and allowing valve 19 to remain in closed position and consequently valve 13 to remain in closed position, thus preventing any further inflation of the tire 140 through line 12 from the high pressure supply line 10. However the lines 12, 17, and 16 and the valves 13, 19, and 18 to which these lines lead respectively, remain under full pressure of the high pressure air supply when valve 24 discharges to the pilot of valve 18 to close it and interrupt the cycle of inflating and gauging.

Valve 29 discharges the pressure in line 15, at a preselected pressure to which the tire is to be inflated, to valve means comprising valve 31, which is opened to allow full high pressure air supply through lines 16 and 32 to the pilot side of valve 33 forcing valve 33 to close and cut off the high pressure air supply from lines 12, 17, and 16 and at the same time bleed the high pressure air from these lines to the atmosphere through the discharge outlet of 3-way valve 33. The operation of valve 29 to shut off the high pressure air from the system at valve 33 is preferred when truck tires are being inflated.

Numerous other modifications may be made to the specific expedients described without departing from the present invention, the scope of which is defined in the following claims.

What is claimed is:

1. A safety circuit for air inflation devices having a high pressure pneumatic supply line connected to an object to be inflated to a pressure significantly lower than the supply line pressure, through an operator controlled valve in said high pressure pneumatic supply line, said safety circuit comprising:

(1) a first pneumatic duct connecting high pressure air from the outlet of said operator controlled valve to the inlet of a spring biased, normally closed, pilot operated, 3-way valve, (2) a second pneumatic duct connecting high pressure air from an outlet of said pilot operated 3-way valve to an object to be inflated when said pilot operated 3-way valve is in opened position, a second outlet of said pilot operated 3-way valve also connecting said object to be inflated to a pneumatic safety line, when said pilot operated 3-way valve is in closed position, (3) a third pneumatic duct connecting the outlet of said operator controlled valve to the inlets of each of a pair of 3-way pilot operated delay valves, the first said 3-way delay valve being a spring biased, normally open valve, the second said 3-way delay valve being a spring biased normally closed valve, the delay time of the first said 3-way delay valve being significantly different from the delay time of the second said 3-way delay valve, (4) a fourth pneumatic duct connecting an outlet of the first said 3-way delay valve to the pilot side of said second 3-way delay valve when the first said 3-way delay valve is in opened position, the first 3-way delay valve connecting said fourth pneumatic duct to an atmospheric discharge when in closed position, (5) a fifth pneumatic duct connecting an outlet of the second said 3-way delay valve to the pilot side of said pilot operated 3-way valve when the second said 3-way delay valve is in opened position, the second said 3-way delay valve connecting said fifth pneumatic duct to an atmospheric discharge when in closed position, (6) a sixth pneumatic duct connecting the said outlet of the said second 3-way delay valve to the pilot side of said first 3-way delay valve when the second said 3-way delay valve is in opened position, (7) the pneumatic safety line connecting said second outlet of said pilot operated 3-way valve to the inlet of a relief valve means adapted to discharge the pressure in said safety line at a preselected pressure, (8) a seventh pneumatic duct connecting the discharge of said relief valve means to valve means which prevents further flow of high pressure air from the operator controlled valve to the object to be inflated.

2. A safety circuit as claimed in claim 1 in which the object to be inflated is a passenger car tire and the preselected pressure to which the tire is to be inflated and the relief valve means is to discharge the pressure in the pneumatic safety line is substantially 40 psi (276 KPa).

3. A safety circuit as claimed in claim 2 in which the valve means which prevents further flow of high pressure air to the object to be inflated is the first said 3-way delay valve, and the said relief valve means is adapted to discharge into the pilot side of the first said 3-way delay valve, thereby maintaining the first said 3-way delay valve in its closed position.

4. A safety circuit as claimed in claim 3, and further including an eighth pneumatic duct connected to said second pneumatic duct and also connected distally to a pressure gauge.

5. A safety circuit as claimed in claim 4, and further including a pressure relief means connected distally to said eighth pneumatic duct.

6. A safety circuit as claimed in claim 4 and further including a manual pressure bleed valve connected distally to said eighth pneumatic duct.

7. A safety circuit as claimed in claim 1 in which the pilot of the first said 3-way delay valve holds the first 3-way delay valve closed against the pressure of its spring bias for a first delay period between one-quarter and three quarters of a second after said fifth pneumatic duct is connected to the associated atmospheric discharge.

8. A safety circuit as claimed in claim 7, wherein the first delay period is substantially one half-second.

9. A safety circuit as claimed in claim 8 in which the pilot of the second said 3-way delay valve holds the second 3-way delay valve open against the pressure of its spring bias for a second delay period between two and eight seconds after the fourth pneumatic duct is connected to the associated atmospheric discharge.

10. A safety circuit as claimed in claim 9 wherein the second delay period is substantially four seconds.

11. A safety circuit as claimed in claim 1 in which the object to be inflated is a truck tire and the preselected pressure to which the tire is to be inflated and the relief valve means is to discharge the pressure in the pneumatic safety line is substantially 90 psi (620 KPa).

12. A safety circuit as claimed in claim 11 in which the valve means which prevents further flow of high pressure air to the truck tire is a combination of (1) a spring biased, normally closed, pilot operated, 2-way valve which is piloted open by the discharge of said relief valve means and opens a ninth duct for high pressure air from the supply line to the pilot of (2) a manually opened, pilot closed, three-way valve which closes the supply of high pressure air from the outlet of said operator controlled valve to said first and third pneumatic ducts, said manually opened, pilot closed 3-way valve in its closed position discharging said first and third pneumatic ducts to atmosphere.

13. A safety circuit as claimed in claim 12 and further including a spring biased, normally open, manually closed, 3-way valve in said high pressure pneumatic supply line between said operator controlled valve and said manually opened pilot closed, 3-way valve, said spring biased, normally open, manually closed, 3-way valve in its closed position discharging high pressure air from the supply line to the pilot of said manually opened, pilot closed, 3-way valve.

* * * * *